INVENTORS,
WILLIAM L. GROVES JR. &
ROBERT L. HUDDLESTON

BY
Glen M. Burdick
ATTORNEY

United States Patent Office 3,684,736
Patented Aug. 15, 1972

3,684,736
LOW-FOAMING SURFACE ACTIVE COMPOSITIONS AND METHOD OF PREPARING SUCH COMPOSITIONS
William L. Groves, Jr., 715 N. 7th, and Robert L. Huddleston, 1625 Meadowbrook, both of Ponca City, Okla. 74601
Filed Sept. 10, 1970, Ser. No. 70,980
Int. Cl. B01f 17/00, 17/18
U.S. Cl. 252—355
2 Claims

ABSTRACT OF THE DISCLOSURE

A surface active agent produced by combining an anionic surfactant, viz, an anionic ammonium ether sulfate compound, with a cationic surfactant, viz, dodecylbenzyltrimethylammonium chloride, to form an electro-neutral complex of low solubility in water, and preferably utilized as an aqueous suspension containing less than 1 weight percent of the complex.

BACKGROUND OF THE INVENTION

Field of the invention

This invention relates to surface active agents, and to processes for producing surface active agents. More specifically, the present invention relates to electro-neutral surfactant compositions having very low surface tension, and to the method of preparing such compositions. In another aspect, the invention relates to a new use of known surfactants to produce surfactant compositions having low foam producing and low surface tension properties.

Brief description of the prior art

It is known in the detergent and surfactant technology that the addition of both cationic and anionic surface active compounds to an aqueous solution results in the formation of an electro-neutral complex which precipitates from solution. It has been generally supposed that the electro-neutral complex thus formed possesses no significant surface active properties.

SUMMARY OF THE PRESENT INVENTION

The present invention provides a process for producing a surfactant composition which is characterized in having surprisingly good surface active characteristics. Broadly described, the process comprises combining an anionic surfactant and a cationic surfactant in an aqueous environment to yield a substantially stable suspension of an electro-neutral complex in water at a concentration of less than 1 weight percent. The surfactant composition thus produced demonstrates a synergistic lowering of surface tension with respect to both its anionic and cationic precursors, and the foam produced by the neutral complex is substantially less than the foam yielded by either the anionic or cationic surfactant.

An object of the invention is to provide an electro-neutral surfactant composition which has very low surface tension, and which does not produce large amounts of foam.

Another object of the present invention is to provide new uses of known anionic and cationic surfactants.

Additional objects and advantages of the invention will become apparent as the following detailed description of a preferred embodiment of the invention is read in conjunction with the accompanying drawings.

DETAILED DESCRIPTION OF A PREFERRED EMBODIMENT OF THE INVENTION

The present invention is based upon the discovery of the unexpected effect of reacting anionic and cationic surfactants in an aqueous environment. It has been well known in the surfactant technology that anionic and cationic surfactants, when placed in water, ionize to form large hydrophobic anions and cations, respectively. These large anions and cations then react to form electro-neutral complexes of very low solubility in water. The absence of any polar functional groups from the electro-neutral complexes thus formed suggests an absence of significant surface activity from mixtures of water and such complexes, and it has previously been supposed that the reaction product of the anionic and cationic surfactants has little utility as a surfactant.

We have now determined, however, that not only do the reaction products of anionic and cationic surfactants demonstrate significant surface active properties, but that a synergistic effect is obtained by combining these ionic types of surfactant so that the product is characterized in yielding solutions having much lower surface tension than either of the parent materials. The observed synergistic effect is demonstrated by comparison tests which were conducted for the purpose of evaluating the results of combining the two surfactant types. In these tests, there were placed in water varying amounts of a typical anionic surfactant, Adofoam (an ammonium ether sulfate), a typical cationic surfactant, Adomall (a dodecylbenzyltrimethylammoniumchloride), and of the complex formed by mixing these two surfactants in an aqueous environment. The anionic and cationic were water soluble, while the reaction product, when present in amounts exceeding 1 weight percent, formed an easily visible, insoluble gelatinous precipitate. At lower concentrations, however, the complex was suspended in the water to form a haze, and the suspension was stable for a number of days.

Figure 1:
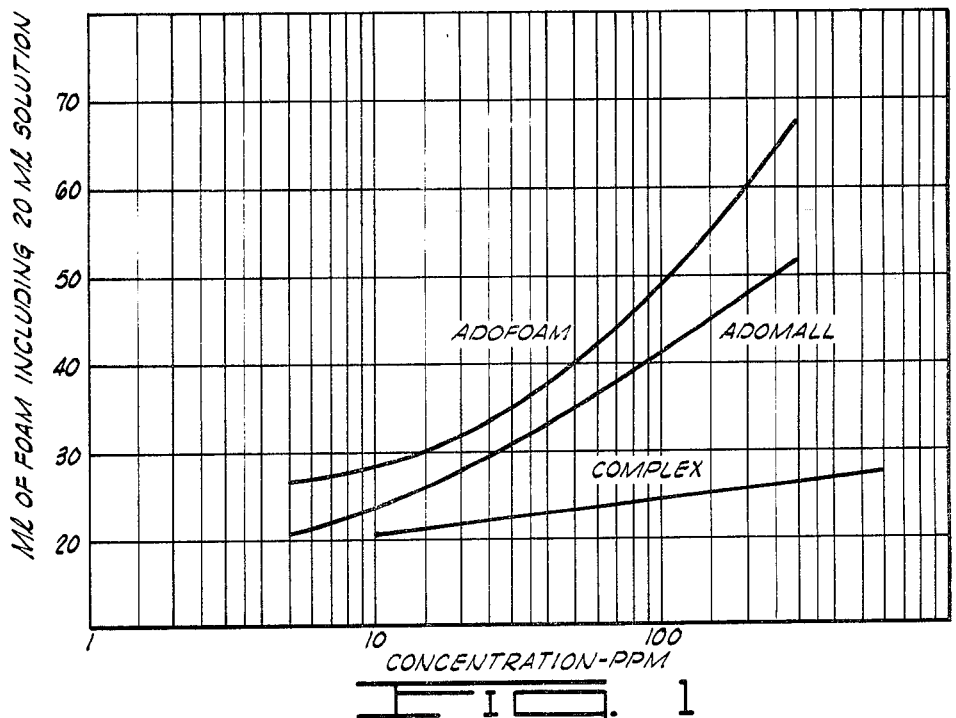
FIG. 1 is a graph showning the foam generated from a 20 ml. solution (or suspension) of certain surfactant materials in water.

The aqueous solutions and suspensions were then subjected to foam generation tests in which 20 ml. of the solution or suspension were placed in a 100 ml. graduate and shaken. The height to which the foam extended in the graduate was then measured. The results of these tests are graphically portrayed in FIG. 1 of the drawing. The complex utilized was formed by mixing equal volumes of the anionic and cationic surfactants. It will be perceived from FIG. 1 that the complex yields substantially less foam then either of its surfactant precursors. This suggests that the electro-neutral complex should demonstrate less surface active effect than the anionic and cationic surfactants from which it is derived.

Figure 2:
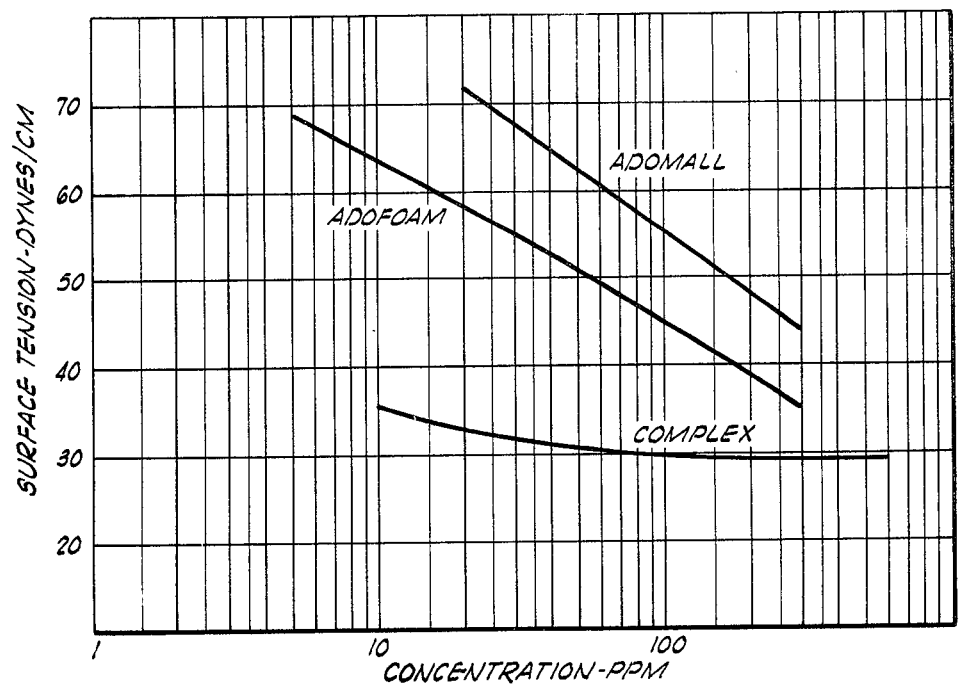
FIG. 2 is a graph showing the surface tension of aqueous solutions of various surfactant materials.

In other tests the surface tensions of the solutions and complex suspensions used in the foam tests were measured with a Du Nuoy tensiometer. The results of these measurements appear in FIG. 2 of the drawing. It will be noted that at verly low concentrations of 10 to 22 p.p.m. the surface tension of the Adomall cationic surfactant is only slightly less than the surface tension of water (about 72). For this low concentration range, the Adofoam anionic is slightly better, effecting about a 10 dyne/cm. reduction. The comparable surface tension measurements of the suspension of the neutral complex present a striking contrast, however. At 10 p.p.m. of the complex, a surface tension of about 35 dynes/cm. is developed, far better than the surface tensions of the parent ionics. Moreover, as contrasted with the Adomall and Adofoam, little seems to be gained in surface tension reduction by increasing the concentration of the complex, so that economical usage and establishment of more stable suspensions characterize the most effective usage of the complex.

The surprising effect of combining the two surfactants specifically cited will apply to other anionic/cationic combinations, with the magnitude of the effect being a function of their individual and complex solubilities. The applications of the invention are manifold. In general, in circumstances where a substantial reduction in the amount of foam generated is desirable, yet maintenance of low surface tension is essential, the neutral complex will meet these desideratum considerably better than either the conventional anionic or cationic surfactant types. The invention further has application in the development of low surface tensions at locations where the approaches to the site do not allow the direct introduction of the neutral complex suspension.

For example, in the known procedures of stimulating hydrocarbon production from relatively tight subterranean formations by the introduction of a low surface tension solution to the interstices of the formation, the neutral complex will at times not be sufficiently compatible with available brines normally used as a carrier for the surfactant to permit the complex to be directly introduced to the zone to be stimulated. In such event, a brine-compatible anionic or cationic surfactant may initially be pumped into the formation as a brine solution. The opposite ionic type of surfactant, which is equally brine-compatible, can then be pumped into the formation as a brine solution. The reaction to form the neutral complex then occurs in the formation, and the complex is developed in situ. From FIG. 2 of the accompanying drawing, it will be apparent that the described procedure not only is effective to achieve a significant reduction in surface tension, but also effects a significant economy in the task of production stimulation, since about 10 p.p.m. of the neutral complex yields results equivalent to about 300 p.p.m. of either the anionic or cationic surfactant.

Although a preferred embodiment of the invention has been herein described in order to illustrate the practice of the invention, it will be understood that various changes and innovations can be effected in the process conditions and specific reactants utilized without departure from the basic principles of the invention. Changes and innovations of this type are therefore deemed to be circumscribed by the spirit and scope of the invention except as the same may be necessarily limited by the appended claims or reasonable equivalents thereof.

What is claimed is:

1. The process of preparing a surface active composition of low surface tension which comprises combining an anionic ammonium ether sulfate compound and dodecylbenzyltrimethylammonium chloride in an aqueous environment to yield a stable suspension of an electro-neutral complex in water at a concentration of less than 1 weight percent.

2. A low-foaming surfactant composition consisting essentially of an electro-neutral water insoluble complex stably suspended in water, said complex being formed by reacting an anionic ammonium ether sulfate compound and dodecylbenzyltrimethylammonium chloride in an aqueous environment.

References Cited

UNITED STATES PATENTS

| 1,867,022 | 7/1932 | Munz et al. | 252—355 |
| 2,143,986 | 1/1939 | Kling et al. | 252—355 X |

RICHARD D. LOVERING, Primary Examiner

U.S. Cl. X.R.

166—270, 300; 252—316, 547